March 22, 1966 A. J. McMASTER ETAL 3,241,168
ELECTRICALLY OPERATED PORTABLE DEVICE
Filed July 30, 1963 5 Sheets-Sheet 5

INVENTORS
Archie J. McMaster
Richard K. Carlson
Samuel B. McMaster
By: Olson, Trexler, Wolters & Bushnell
attys

United States Patent Office 3,241,168
Patented Mar. 22, 1966

3,241,168
ELECTRICALLY OPERATED PORTABLE DEVICE
Archie J. McMaster, Bannockburn, Richard K. Carlson, Chicago, and Samuel B. McMaster, Deerfield, Ill., assignors to G-M Laboratories Inc., Chicago, Ill., a corporation of Illinois
Filed July 30, 1963, Ser. No. 298,622
10 Claims. (Cl. 15—22)

This invention is concerned with electrically operated portable devices and particularly with a battery powered unit incorporating a toothbrush.

For many years electrically operated toothbrushes have been known but it is only recently that they have received a considerable degree of public acceptance. Some members of the dental profession have already enthusiastically approved automatic toothbrushes as an important aid to dental hygiene. With a manually operated toothbrush, all tooth surfaces can be cleaned and the gums massaged adequately if sufficient time and skill are exercised in doing so. Most persons do not take sufficient time or have the manual dexterity to accomplish these operations with full effectiveness. With an electric toothbrush, hard-to-reach tooth surfaces are cleaned rapidly and the circulation of blood in the gums surrounding the teeth is stimulated quickly and effectively with a minimum of effort and skill. Since the proper cleaning of tooth surfaces, including the removal of bacterial plaques, and proper gum massage are now accepted as being important to good oral hygiene, electrically operated toothbrushes are becoming increasingly popular.

Existing automatic toothbrushes are of several basic types. One type is operated with a line cord and plug directly from the electric supply line in the home. Such a type presents a potential shock hazard when used at the lavatory where frequent contact with plumbing fixtures is customary. Any defect in the electric insulation of such an instrument could result in a lethal hazard.

The second type utilizes a rechargeable battery of such size and capacity as to require almost constant recharging when not in use. This type avoids the shock hazard because when in use it is disconnected from the battery charger and from the electric supply line. However, this type imposes the serious requirement that a live electric outlet be available twenty-four hours a day in the bathroom for recharging the battery. Unfortunately, many bathroom outlets are connected through the light switch and are therefore not available when the light is turned off. Also, because of the relatively low efficiency of small electric motors and of the mechanical transmission of motor output to the brush used in this type of instrument, the cost of rechargeable batteries of adequate size and capacity has been high.

A third type is that in which replaceable batteries are used. These have been subject to several criticisms. Some have had insufficient mechanical output to perform the cleaning and massaging functions rapidly and effectively. Also, when such units are stalled by overloading the electric motor, the drain on the battery is at such times excessive because such direct current motors draw several times as much current when stalled as when operating normally. Other such battery powered units, which have adequate mechanical power output, use so much battery energy that battery life is short. To overcome this latter difficulty, objectionably large batteries have been used, or objectionably expensive ones, such as mercury batteries of the type used in transistor radios, have been required.

An object of this invention is to provide an improved motor driven brush or massage device which is highly efficient electro-mechanically and can therefore be operated from small self-contained batteries of either replaceable or rechargeable types and which perform the desired cleaning and massaging functions rapidly and effectively with minimum battery cost.

Another object is to provide an enclosure for such a device which can be opened without tools to replace batteries when necessary, and which can, without damage, be thoroughly rinsed in running water after use for quick and effective cleansing.

Another object is to provide simple but effective liquid-tight switching means which is convenient to use with either hand of an adult or a child, such means requiring only slight manual pressure to operate the electric motor, but conserving battery energy whenever this light pressure is removed.

Another object is to provide a device which can easily be reduced in size for storage in the customary bathroom medicine cabinet, thereby requiring minimum shelf space and not requiring that the brush be removed from the instrument during such storage.

A further object is to provide an electrically operated device with which the motion of the toothbrush is that which is generally accepted by the dental profession as being most effective in cleaning all tooth surfaces and in stimulating gum tissues; such motion being of sufficient speed and amplitude to accomplish the cleaning and massaging functions rapidly but of low enough speed and amplitude to avoid discharging water, saliva and dentrifice from the toothbrush if the latter is inadvertently operated when it is not inside the mouth.

Another object is to provide a completely safe electric brush which operates at low voltage without any attachment during operation to the electric supply line, the housing for the electric brush containing two switches which are electrically in parallel to permit ease of operation regardless of the position of the device in either hand of the user.

Another object is to provide an electric toothbrush with which excessive pressure of the brush against teeth or gums reduces the amplitude of motion of the tips of the bristles of the brush, thereby minimizing the hazard of injuring tooth structure or gum tissue and also minimizing battery drain.

Other and further objects and advantages of the present invention will be apparent from the following description when taken in connection with the accompanying drawings wherein.

Referring now in greater particularity to the drawings, and first to FIGS. 1–6, there will be seen a portable, battery powered electric device identified generally by the numeral 30, and comprising in the specific illustration what is known as an electric toothbrush. However, it is to be understood that the brush itself, comprising a shank 32 and bristles 34 is readily detachable from the output shaft of the device 30, and is replaceable by other tools as will be set forth hereinafter.

The electric device 30 comprises a housing 36 consisting of a lower housing portion 38 and an upper housing portion 40. The housing is oval in horizontal section, as readily may be seen in FIG. 4, and is molded of a suitable plastic. One such suitable plastic is acrylonitrile-butadine-styrene copolymer, referred to as ABS, and sometimes known as modified polystyrene.

The bottom portion of the housing comprises a battery case, and as shown in FIGS. 1, 4–6 and 10, the lower portion 38 is provided with a generally flat bottom 42 recessed up somewhat from the lower edges 44 of the sidewalls 46, which extend upwardly and outwardly on a smooth curve from the lower edges. The upward recessing of the bottom provides clearance for the head 48 of a rivet 50 securing a battery spring 52, comprising a pair of leaves 54 extending outwardly and upwardly from the rivet 50. A pair of parallel ridges 56 upstands from the bottom and coacts with the rivet 50 properly to position the battery spring 52.

A pair of vertically elongated ribs 58 projects into the bottom housing portion 38 along the major axis thereof, and extends up from the bottom 42 thereof. A similar pair of ribs 60 extends inwardly along the minor axis of the lower body portion, and up from the bottom thereof. A pair of conventional dry batteries 62 is supported in upstanding relation on the two leaves 54 of the spring 52, each being held in position by one of the ribs 58 and the adjacent pair of ribs 60.

Figures 1, 2, 3, 4:
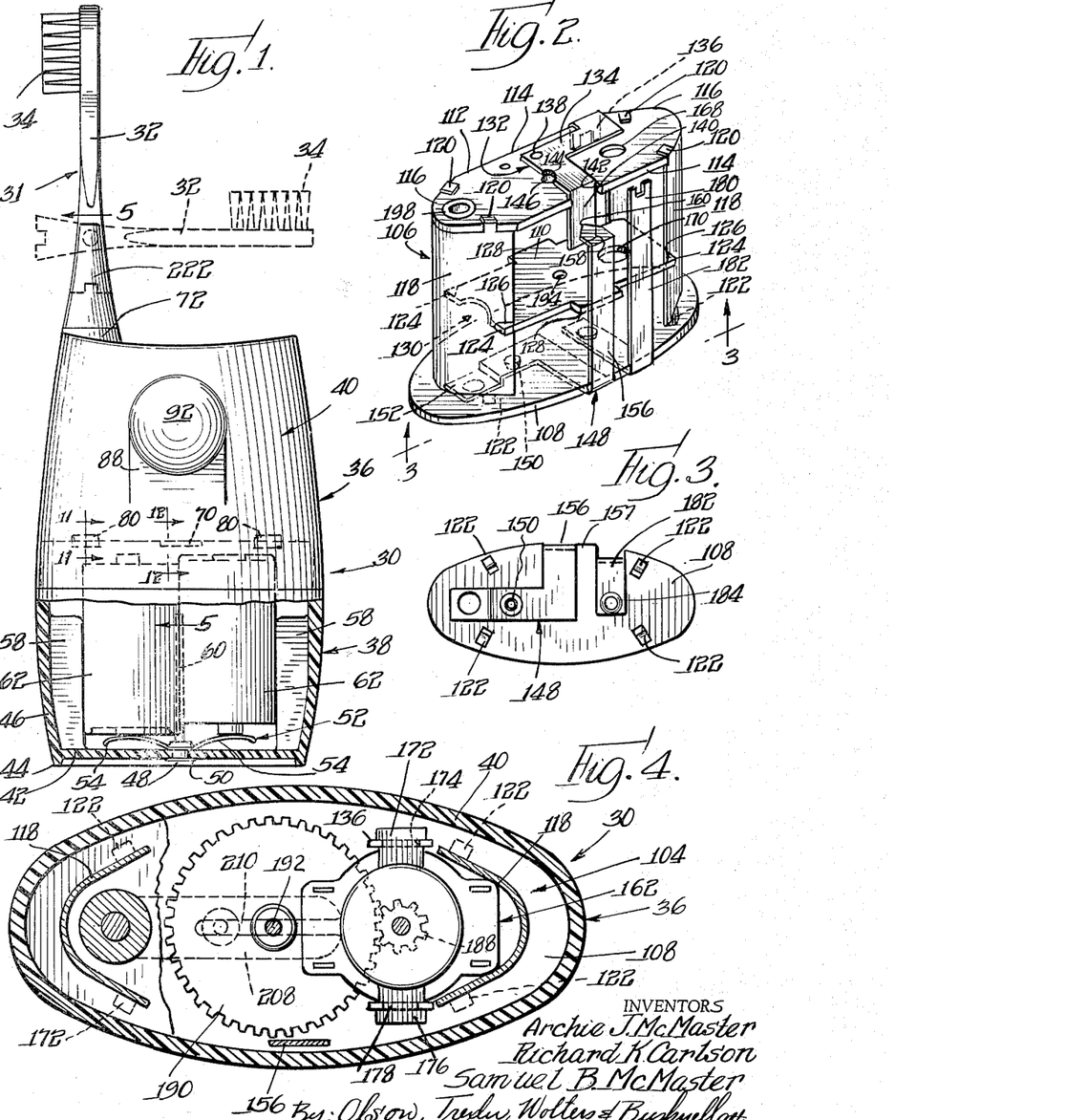
FIG. 1 is a front elevational view of a battery powered device, specifically a toothbrush, constructed in accordance with the present invention, a part thereof being broken away for clarity of illustration.
FIG. 2 is a perspective view on an enlarged scale of a sub-assembly of the device.
FIG. 3 is a bottom view of the sub-assembly of FIG. 2.
FIG. 4 is a horizontal cross sectional view on an enlarged scale taken substantially along the line 4—4 in FIG. 6, parts being broken away for clarity.

As will be seen in FIG. 1, the sidewalls 46 of the lower housing portion 38 thicken as they progress upwards. Adjacent the top, the walls have an external shoulder 64 (see FIGS. 5, 6, 11 and 12) providing a relatively thin wall section 66 for cooperation with the upper housing portion 40.

Figure 11:
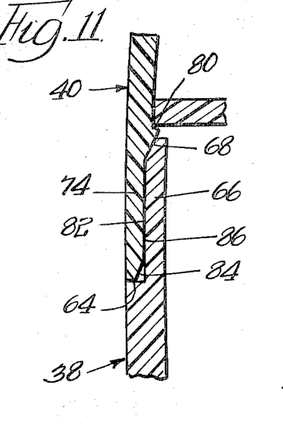
FIG. 11 is an enlarged detail vertical sectional view taken along the line 11—11 in FIG. 1.
Figure 12:
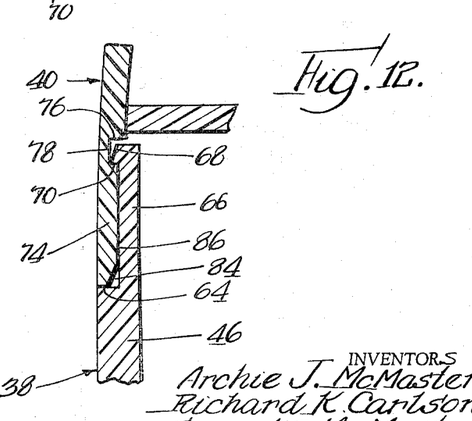
FIG. 12 is a similar view taken along the line 12—12 in FIG. 1.

The upper extremity of the inner wall portion 66 is beveled about its outer edge as indicated at 68 in FIGS. 11 and 12. In addition, the upper edges are provided with two opposed latching teeth 70 lying substantially on the minor axis of the housing, having an underlying shoulder, and with the upper portion thereof forming a continuation of the bevel 68, for interlocking relation with the upper housing portion as hereinafter will be brought out.

The top of the upper housing portion 40 is flat in the direction of the minor axis, and is concave in the direction of the major axis. Adjacent one end or short radius portion thereof, the top is provided with an upstanding boss 72 having a flat upper surface perpendicular to the vertical axis of the housing. The internal structure or shape of this boss will be brought out hereinafter, and is not considered at the present time.

Adjacent its bottom edge, the upper body portion 40 is provided with a relatively thin wall portion 74 joined at an internal shoulder 76 (FIGS. 5 and 6) to a thicker upper wall portion. Adjacent and immediately below this internal shoulder, there is provided a pair of recesses 78 (FIG. 12) along the minor axis of the housing for receipt of the projecting teeth 70 to lock the upper and lower housing portions together. In addition, there are four wedges 80 extending above and below the internal shoulder 76 to coact on their lower surfaces with the beveled edge 68 of the lower housing portion, and to coact along their upper surfaces with electrical parts hereinafter to be discussed.

It will be observed that the depending relatively thin wall portion 74 of the upper housing portion 40 is in the form of a skirt having an inner surface 82 extending substantially straight up and down and flared slightly outwards at the bottom as indicated at 84. Complementary thereto, the upstanding relatively thin wall portion 66 of the lower housing portion 38 has an outer surface 86 which extends substantially straight up and down and which forms a substantially surface engagement with the depending skirt portion surface 82 over a rather substantial area, thereby rather effectively sealing the juncture of the two housing portions without the necessity for the provision of any special sealing means. The sealing is augmented by the fact that the housing is made of a material with which water exhibits substantial capillary repulsion. Thus, water under low pressure does not tend to enter the juncture between the two housing portions.

As will be understood, the sidewalls of the housing are sufficiently flexible that the teeth 70 will cam their way past the outwardly flared lower edges 84 (FIG. 12), with relative deformation of the skirt 74 and upstanding wall portion 66 allowing the parts to interfit until the teeth 70 snap into the recesses 78. Separation of the two housing portions is effected in a reverse manner, with pressure being exerted on the sidewalls of the lower portion by the thumb and forefinger, and with a certain amount of canting of the two housing portions acting to withdraw the teeth 70 from the recesses 78, thereby to allow the two housing portions to be separated.

The upper housing portion 40 (FIG. 1) tapers inwardly and upwardly, more along the major axis than along the minor axis. An integral ramp portion 88 (FIG. 5) is provided on the exterior of the housing substantially parallel to the vertical axis of the device 36, and terminating at a short distance below the top wall of the housing. The ramp portion is provided with a circular opening 90 which receives a pushbutton actuator 92. The pushbutton actuator is of relatively flexible material, such as a vinyl plastic. The pushbutton actuator 92 is provided at a distance spaced in slightly from its outer periphery with an inwardly extending cylindrical wall 96 (FIG. 5) received in the housing opening 90. Conveniently, the wall is provided with a lug 98 (FIGS. 5 and 8) cooperable with a groove in the opening for rotationally positioning the pushbutton actuator. The pushbutton actuator 92 includes a relatively thin diaphragm 100 (FIG. 5) with an integral projection 102 on the backside thereof. The projection is designed to engage and deflect a switch member, as will be brought out hereinafter, upon manual depression or flexing of the diaphragm 100 of the pushbutton actuator 92.

Reference now should be had to FIGS. 2–6 for the showing of the power drive unit, hereinafter identified by the numeral 104. The power drive unit 104 (FIGS. 4 and 5) comprises a sub-assembly in the form of a frame or supporting means 106 best seen in FIG. 2. This frame includes a bottom gear plate 108, a center or intermediate gear plate 110, and a top gear plate 112, each made of insulating material, conveniently plastic. The bottom gear plate is oval in configuration, and fits snugly within the upper housing portion, being held therein by the wedges 80.

The upper or top gear plate is somewhat smaller in outline, having straight side edges 114, with somewhat parabolic ends 116, each including a circular portion and a pair of straight sides diverging to the sides 114. Metallic spacer members 118, conveniently of aluminum, are of substantially the same section as the end portions of the top or upper gear plate 112. The spacers 118 underlie the edges 114 of the upper gear plate and are provided with lugs 120 turned over the top thereof to secure the upper or top gear plate to the spacers. The spacers at the bottom are provided with lugs 122 extending through suitable apertures in the bottom plate 108 and turned outwardly beneath this plate to secure the spacers to the bottom plate.

The center or intermediate plate 110 is substantially rectangular in shape, and has the corners thereof 124 received in edge notches 126 of the spacers 118, slightly below the center of the height thereof. The center plate also is provided midway of its long sides with a pair of shallow outwardly extending tongues 128 for limiting the movement of a switch member, as will be brought out hereinafter. At one end (the left end as viewed in FIG. 2), an arcuate recess 130 is provided in the end of the center plate to provide clearance for an operating part hereinafter to be described.

A relatively fixed contact and connecting member 132 is secured to the top gear plate, and includes a strap 134 of generally L-shape, fabricated of copper or the like highly conductive material with the characteristic of being sufficiently soft to take a permanent set. The L-shaped member 134 has a depending bifurcated tail 136 for connection to a metallic contact from a motor, as hereinafter to be set forth. The member 132 is secured to the top of the plate 112 by means of a rivet 138. The member 132 further has a depending fixed contact portion 140 which extends through a notch 142 in the edge 114 of the top gear plate. It will be observed that the side of the member 132 is provided with a preferably semi-circular notch 144 adjacent a hole 146 in the plate to provide clearance for a shaft member hereinafter to be described.

The bottom gear plate is provided with a strap-like member 148 serving a multiplicity of purposes. On the underside of the bottom gear plate, this strap-like member takes the form of an L, and is secured in place by a rivet having a frusto-conical head 150 serving as a battery contact member engageable with one terminal of one of the batteries 62 to provide an electrical connection to the member 148.

Adjacent the rivet, the strap-like member 148 is provided with a portion 152 offset below the bottom gear plate 108, and having an aperture therein. This offset portion bears against and helps to retain a ball bearing 154 in an aperture in the bottom plate 108.

The strap-like member 148 further includes an upstanding movable switch contact portion 156 extending upwards through a notch 157 in the side of the bottom gear plate 108. The top of the movable switch contact member 156 is deflected inwards at a right angle at 158 and is provided with a sharp point 160 engageable with the fixed contact 140.

Figures 5, 6, 7, 8:
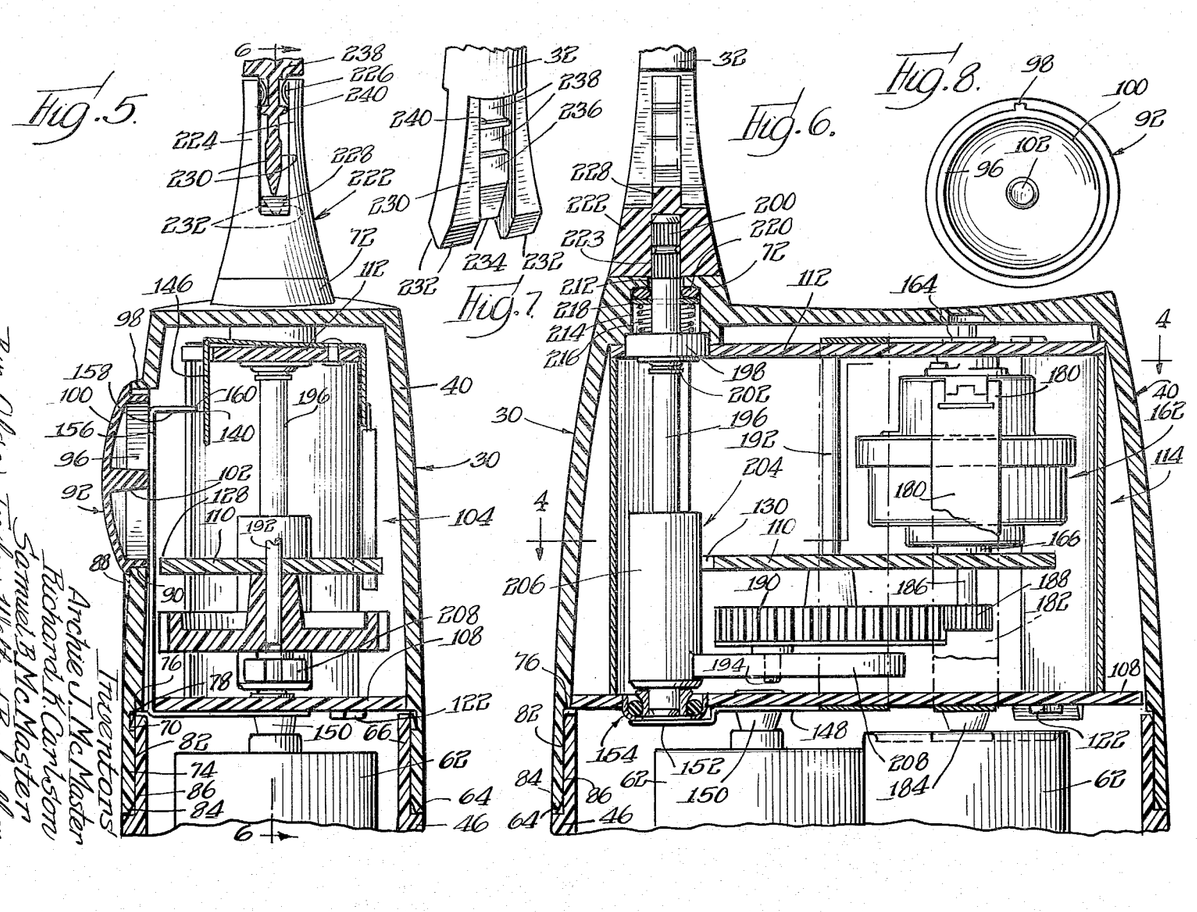
FIG. 5 is a fragmentary vertical cross sectional view on a substantially enlarged scale as taken along the line 5—5 in FIG. 1.
FIG. 6 is a vertical sectional view taken along the line 6—6 in FIG. 5.
FIG. 7 is a further enlarged perspective view of the butt end of the toothbrush shank.
FIG. 8 is a plan view of the inner face of the pushbutton for operating the motor switch.
Figure 9:
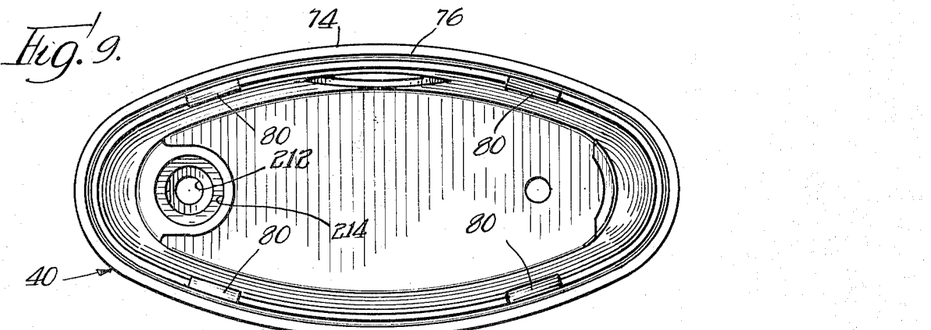
FIG. 9 is an inside plan view of the top body section.
Figure 10:
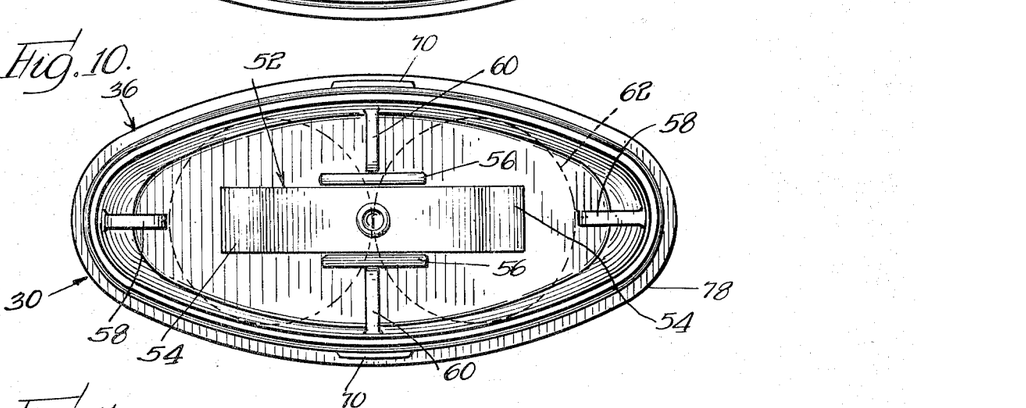
FIG. 10 is an inside plan view of the bottom body section of the device.

The upper portion of the contact member 156 is disposed opposite the pushbutton protuberance 102, as readily may be seen in FIG. 5, whereby the point 160 is pushed into engagement with the fixed contact member 140 upon depression of the pushbutton contact member.

The tongue 128 of the intermediate plate 110 limits inward movement of the movable switch member 156 under the influence of the pushbutton actuator. The fixed switch member 140 is deflected upon the first contact thereof by the movable contact member, and takes a permanent set, thereby being permanently adjusted in accordance with Kitto U.S. Patent 2,614,195.

A small D.C. motor 162 designed to operate satisfactorily on the two batteries 62 in series is mounted between the top plate 112 and the center plate 110. The specific structure of the motor is not particularly important relative to the present invention, but it will be observed that the motor has upper and lower hubs 164 and 166 respectively, received in suitable apertures 168 and 170 in the top and center plates to mount the motor in position. The motor is provided with a rearwardly upstanding strap-like electrical connector 172 (FIG. 4) which is received in the bifurcated depending end 136 of the member 134. The contact member or electrical connection 172 preferably is notched at 174 to interfit with the bifurcated depending end 136. The juncture then is soldered.

The motor 162 also is provided with a second strap-like electrical connector 176 extending therefrom diametrically opposite to the strap-like connector 172. This connector also is notched at 178, and is received in the bifurcated upstanding end 180 of an electrical lead 182 (FIG. 2) of strap-like configuration. The interfitting members 178 and 182 are soldered, as will be appreciated. The member 182 continues at a right angle beneath the bottom plate 108, and is secured thereto by a frusto-conical headed rivet 184 which serves as the second terminal engageable with the second battery 62.

As will be appreciated, the strap-like electrical connectors 172 and 176 and their coaction with the respective members 134 and 182 insures against rotation of the motor housing as mounted by the axially extending hubs.

The motor 162 is provided with an axially extending output or motor shaft 186. The output shaft 186 is provided at its lower end with a small gear 188 of any suitable material, brass being one satisfactory example.

The small gear 188 meshes with a large gear 190 of suitable material, such as a plastic material, fixed on a shaft 192. This shaft rotates in the aforementioned hole 146 in the upper plate 112, and in an aligned hole 194 in the center plate. The gear is provided with a depending crank pin 194.

An output shaft 196 is journalled in the ball bearing 154 and in an aligned ball bearing 198 mounted in the top gear plate 112. The upper end of the shaft extends beyond the boss or protuberance 72 at the top of the housing 40, and is provided with a knurled upper end 200. A C-washer 202 snapped into a groove in the shaft 196 prevents the shaft from rising up through the ball bearing 198.

Adjacent the bottom end of the shaft there is provided a rocker arm assembly 204 comprising an elongated sleeve 206 fixed on the shaft, and a radially extending rocker arm 208 having a longitudinal (radial) slot 210 (FIG. 4) therein receiving the crank pin 194. Thus, when the motor rotates continuously in either direction, depending on the polarity with which the batteries 62 are inserted, the small gear 188 will drive the large gear at a reduced rate, and this gear will act through the crank pin 194 and rocker arm 208 to oscillate the output shaft 196.

In FIG. 6, it will be seen that the boss 72 is provided with a hole 212 of suitable size to accommodate the shaft 196. The boss further is counterbored from below as indicated at 214. A helical spring 216 is housed within the counterbore 214 and bears at the bottom against the ball bearing 198, and at the top against a washer 218 which holds an O-ring 220 at the top of the counterbore substantially to seal the shaft against the entrance of moisture.

An adapter 222 of generally frusto-conical shape is mounted on the upper end of the output shaft 196, having a bore 223 therein forming a press fit with the knurled shaft end 200. As may be seen in FIG. 5, the adapter is bifurcated, having a pair of upstanding arms 224 with a pair of confronting protuberances 226 at the upper end thereof. In addition, there is a single axially extending protuberance 228 between the arms 224 and the base end thereof.

The shank 32 of the brush 31 is provided with a flattened lower end 230, see FIG. 7. The lower end is provided with tapered tips 232, and there is a longitudinal recess 234 between these tips, cooperable with the protuberance 228. A longitudinal groove 236 extends between the flattened side portions 230 in alignment with the notch 234, and is provided with two deepened portions 238, leaving a transverse protuberance 240 between them. There are two such structures, on diametrically opposite sides of the brush shank 32.

For use, the shank is inserted all of the way into the space between the adapter arms 224 with the protuberance 228 received in the shank notch 234. The protuberances 226 are received in the uppermost of the two depressions 238, above the transverse member 240. For storage, the shank is lifted up until the protuberances 226 snap over the members 240 and into the lower of the depressions 238, whereupon the toothbrush is pivotable to the dash line position shown in FIG. 1. This allows the electric toothbrush to be stored in a bathroom shelf of limited height.

Figures 13, 14, 15:
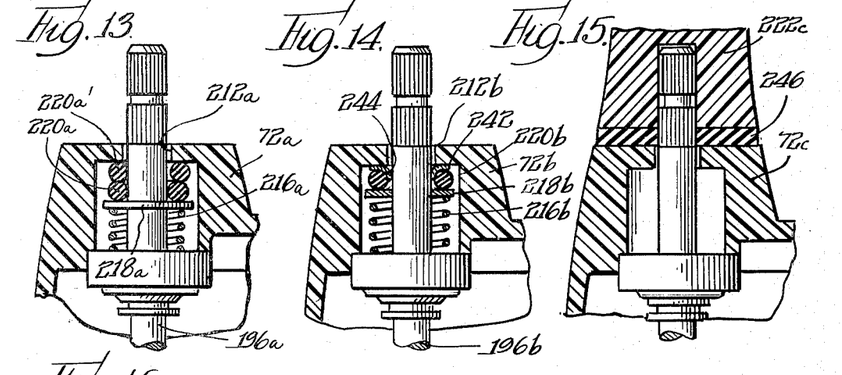
FIG. 13 is a detail sectional view on an enlarged scale similar to a part of FIG. 6 at the exit end of the output shaft, showing a modification of the invention.
FIG. 14 is a view similar to FIG. 13 showing a further modification.
FIG. 15 is another similar view showing yet another modification.

Reference now should be had to FIG. 13 for a showing of an improved seal where the output shaft passes up and out of the housing. Most of the parts shown in FIG. 13 are similar to those heretofore shown and described, and are identified by like numerals with the addition of the suffix $a$, thereby avoiding prolixity of description. The essential difference in the embodiment shown in FIG. 13 is that there are two O-rings provided, respectively identified as 220$a$ and 220$a'$, axially adjacent one another about the shaft. As will be appreciated, if an O-ring fails to move with reference to the housing upon radial displacement of the shaft, the ring will be flattened against the shaft on one side, leading to the presence of a gap on the other side between the ring and the shaft, thereby allowing axial leakage. In the present embodiment of the invention, with the second O-ring below the first, the lower ring rolls on the upper one with less tendency to flatten at the shaft. The addition of a silicone grease minimizes friction between the upper O-ring and the housing, and between the two rings and the shaft, thus reducing the friction load on the motor and improving the seal. It has been found that with two O-rings as shown in FIG. 13, a seal can be maintained against fifteen pounds of air or water pressure (above atmospheric) while the shaft is oscillating and has a force of several ounces applied radially to it.

A slightly different embodiment is shown in FIG. 14, similar numerals again being used with the addition of the suffix $b$. The difference here is that a rubber-like gasket or washer 242 is provided between the O-ring 220$b$ and the housing. The gasket or washer has a small enough inside diameter that a portion thereof is turned up as a lip 244 when the shaft is inserted through it. Alternatively, the lip can be turned down along the shaft. The important thing is that the O-ring and washer coact to provide a better seal than is possible with an O-ring alone.

A further modification of the invention is shown in FIG. 15. Again, similar parts are identified by like numerals, this time with the addition of the suffix $c$. The present modification may be used in addition to any of the foregoing embodiments, and the essential distinguishing feature resides in the provision of a small plastic washer 246 between the boss 72$c$ and the adapter 222$c$. This washer is made of a material exhibiting high capillary repulsion with respect to water. In running water, this non-wetting washer causes the water to form droplets, rather than to penetrate the small clearance on either side of the washer. It is also highly desirable that this washer have excellent anti-friction qualities, so as to allow as tight a fit as possible without binding or placing an undue load on the motor. Accordingly, one preferred material is a fluorocarbon polymer such as polytetrafluoroethylene, sold under the trademark "Teflon." Polyethylene is another satisfactory material.

In the first embodiment of the invention as shown and described, the pushbutton actuator 92 was provided with a circular flange or skirt received in an aperture in the housing and cemented in place. Cementing can be avoided in accordance with the modification of FIG. 16, similar parts again being identified by like numerals with the addition of the suffix $d$, wherein the skirt 96$d$ is provided with an outwardly directed or flared flange or lip 248. The lip 248 simply snaps through the housing aperture 90$d$ due to the resiliency of the pushbutton actuator, and thereafter springs out to seal the pushbutton actuator to the housing.

Figures 16, 17, 18, 19:
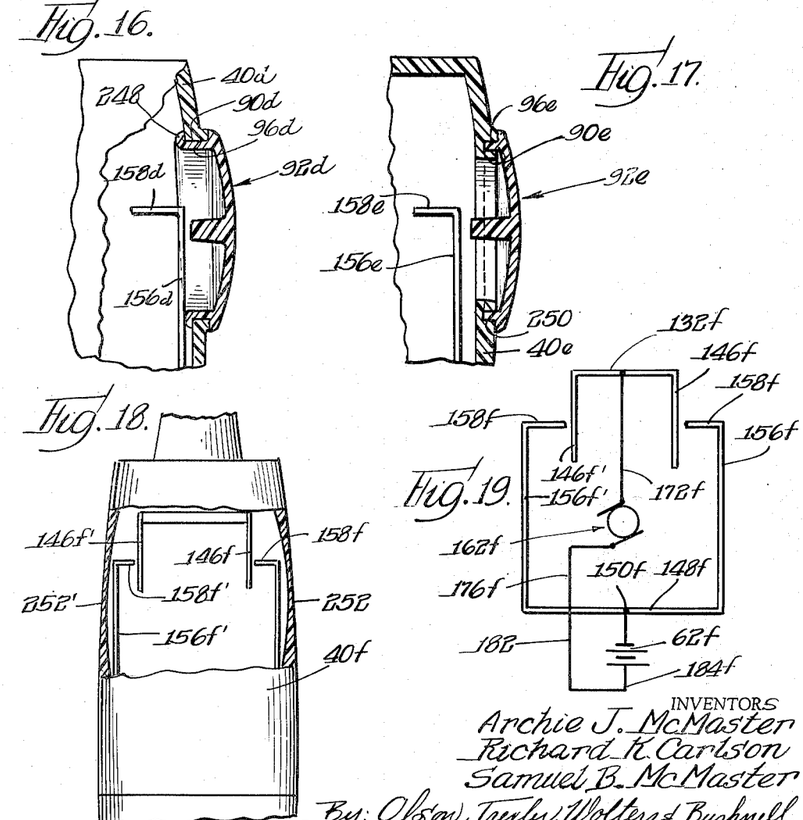
FIG. 16 is a vertical sectional view through the pushbutton switch operator showing one form of attachment of the switch button.
FIG. 17 is a similar view showing a modification of the switch button and the attachment thereof.
FIG. 18 is a side view of the device with part of the case broken away to show a double switch arrangement for the motor.
FIG. 19 is an electric wiring diagram corresponding to the embodiment of FIG. 18.

A further modification of the pushbutton actuator is shown in FIG. 17, wherein the skirt 96$e$ is of larger diameter than the housing aperture 90$e$. The skirt 96$e$ is received in an annular groove 250 concentric with and lying outside of the aperture 90$e$, and is cemented in place.

Problems of sealing the pushbutton actuator to the housing can be avoided entirely in accordance with the modification in FIG. 18. In this figure, the pushbutton actuator is replaced by a thin walled portion 252 adjacent the flexible electric contactor 156$f$, 158$f$. As will be apparent, similar numerals are used in FIGS. 18 and 19 with the addition of the suffix $f$. In addition, certain of the parts are duplicated, as is indicated by a prime mark following the numerals.

In particular, it will be observed that there are two thin, flexible wall areas, namely 252 and 252'. Either of these areas (or both) can be deflected by the thumb or fingers to deflect the adjacent contact member 156$f$, 158$f$, or 156$f'$, 158$f'$ into engagement with the corresponding fixed contact.

It will be apparent from an inspection of the electric wiring diagram of FIG. 19 that the contacts 158$f$, 158$f'$ and their associated fixed contacts 146$f$ and 146$f'$ are connected in parallel whereby closure of either pair of contacts will result in running of the motor 162$f$.

Experimentation has revealed that there are definite limits of speed and amplitude of a toothbrush having rotary oscillatory motion, as in the present invention, which provide optimum performance. In many commercial units, the speed is too high. As a result, if the toothbrush is operated outside the mouth, water, saliva and dentifrice are thrown a considerable distance through the air with most undesirable results. Too high a speed may also cause damage to the gums. On the other hand, if the speed and amplitude are too low, the time required for effective toothbrushing is undesirably long. As a result, the teeth are likely to be inadequately brushed.

Figures 20, 21, 22, 23, 24, 25, 26, 27, 28, 29:
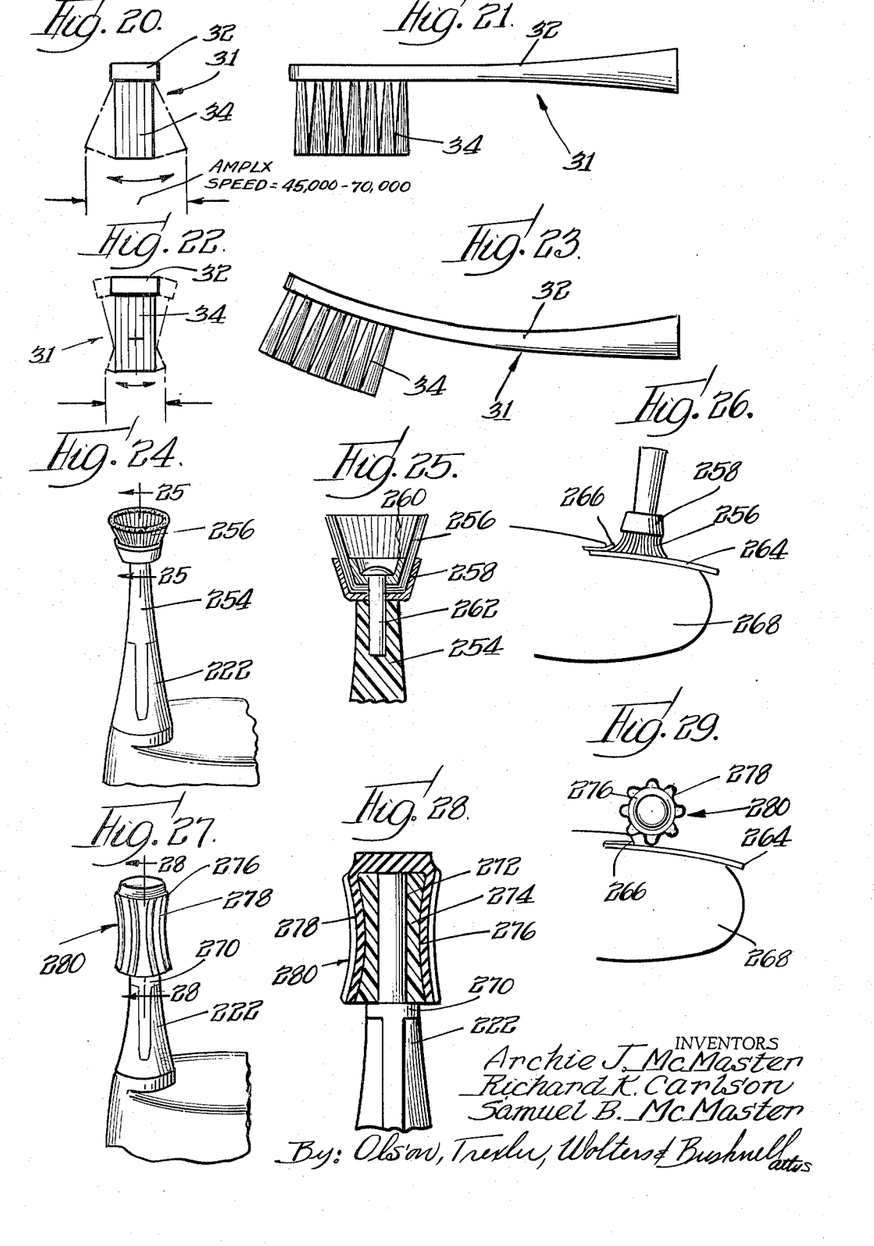
FIG. 20 is an end view of a toothbrush mounted on the device and forming a part of the present invention, the view showing the oscillation of the toothbrush.
FIG. 21 is a side view of the toothbrush of FIG. 20.
FIG. 22 is a view similar to FIG. 20, showing the manner in which oscillation is decreased by toothbrush shaft deflection.
FIG. 23 is a side view of the toothbrush similar to FIG. 21, but showing the shaft deflected due to excessive loading on the bristles of the brush.
FIG. 24 is a top perspective view of the device with a cuticle brush mounted thereon.
FIG. 25 is a vertical sectional view through the cuticle brush of FIG. 24 as taken substantially along the line 25—25 in FIG. 24.
FIG. 26 is a side view showing the cuticle brush working on a fingernail and cuticle.
FIG. 27 is a perspective view of the device with a nail massage tool thereon.
FIG. 28 is a vertical sectional view through the massage tool as taken along the line 28—28 in FIG. 27.
FIG. 29 is a detail view showing action of the massage tool on a fingernail.

Also, the brush tends to remain stationary against the teeth, with the housing and hand shaking up and down. The present inventors have established the effective limits of speed and amplitude with the brush outside the mouth and under no load to be 1,500 cycles per minute with an amplitude of oscillation of 30 to 40 degrees, or 2,500 cycles per minute with a 20 to 28 degree amplitude. The product of amplitude in degrees and speed in cycles per minute thus should be between 45,000 and 70,000. This is illustrated in FIGS. 20 and 21, wherein the bristles have a length of 3/8".

It will be appreciated that if one presses too hard on the teeth with the bristles, various undesirable results can be obtained. Too great a load could be placed on the motor, causing it to stall and to reduce greatly the battery life. Looking at it from the point of view of the user, excessive pressures could also result in damage to the gums, or even to the teeth, if an abrasive dentifrice were used. These drawbacks are avoided with the present invention, as will be seen with reference to FIGS. 22 and 23.

In accordance with the present invention, the shaft is deflectable under radial load, whereby the amplitude of rotation of the bristle tips decreases upon deflection of the brush head. This improves the mechanical advantage, thereby reducing the tendency to stall the motor and shorten battery life, and decreases the linear movement of the bristle tips, thereby avoiding injury to the user.

It has been found that the present device is also remarkably efficient with a different type of brush in removing dry cuticle from the edges of a fingernail. Thus, in accordance with FIGS. 24–26, there is provided a shank 254 received in the adapter 222 in the same manner as with the toothbrush, but this example being in the nature of a cuticle brush. Frusto-conical bristles 256 are held between concentric cups 258 and 260, conveniently metallic, secured to the end of the shank 254 by a metallic pin 262.

In use, the bristles 256 are pressed against the fingernail 264 and against the surrounding cuticle 266 of a finger 268. The bristles abrade and remove dried material (dried skin, etc.) and also lift live cuticle from the nail. This minimizes hangnails, and provides a neat appearance. The oscillating motion does not cause damage to the cuticle as does a rotary motion. The bristles more or less pick at bits of material, rather than tearing them away. Furthermore, the symmetrical motion is best for working on either hand, while holding the brush in the other hand.

The tool is also useful as shown in FIGS. 27–29 for massaging the fingernail and live cuticle. A shank 270 is received in the adapter 222, as before, and extends at 272 through a plastic member 274 which is generally cylindrical in nature, but which has concave sides. A rubber cover 276 fits over the plastic member 274, and is provided with longitudinal ribs 278. The entire assembly may be referred to as a rubber massage tool 280. The tool is held against the fingernail, and/or the live cuticle surrounding it for massaging the fingernail and cuticle, preferably with the addition of a softening and nail building cream. Again, the oscillatory motion prevents damage to the cuticle and is well adapted for use with either hand.

It is to be understood that the specific illustrative examples of the invention are for purposes of disclosure only, and are not to be considered as limitative. Various changes will no doubt occur to those skilled in the art, and will be understood as forming a part of the invention insofar as they fall within the spirit and scope of the appended claims.

We claim:

1. A portable electric device comprising a housing of molded material having high capillary repulsion with respect to water, an electric motor mounted within said housing, means for mounting a battery within said housing, said battery mounting means including battery contact means, a circuit means including electric switch means for connecting said battery contact means to said motor to run said motor, said housing having an opening therein, an output shaft extending through said housing opening, means operatively connecting said shaft and said motor for arcuate movement of said shaft upon running of said motor, a working tool connected to said shaft exteriorly of said housing, said housing having means therein for manually operating said switch from outside of said housing, said housing having means for readily opening and closing said housing to gain access to a battery held by said battery mounting means, and means including the high capillary repulsion of the housing material with respect to water for preventing running water from entering said housing at the output shaft opening, at the switch operating means, and at the housing opening and closing means, the means for preventing running water from entering the housing shaft opening comprising a plurality of axially spaced coaxial, resilient O-rings encircling said shaft in contact therewith, and spring means axially urging said O-rings into contact with each other with one of said O-rings thereby being urged into contact with said housing.

2. A portable electric device comprising a housing of molded material having high capillary repulsion with respect to water, an electric motor mounted within said housing, means for mounting a battery within said housing, said battery mounting means including battery contact means, a circuit means including electric switch means for connecting said battery contact means to said motor to run said motor, said housing having an opening therein, and output shaft extending through said housing opening, means operatively connecting said shaft and said motor for arcuate movement of said shaft upon running of said motor, a working tool connected to said shaft exteriorly of said housing, said housing having means therein for manually operating said switch from outside of said housing, said housing having means for readily opening and closing said housing to gain access to a battery held by said battery mounting means, means including the high capillary repulsion of the housing material with respect to water for preventing running water from entering said housing at the output shaft opening, at the switch operating means, and at the housing opening and closing means, and a tool attachment member on said shaft, exteriorly of said housing, wherein the means for preventing running water from entering said housing at the shaft opening comprises a washer of a material exhibiting with water a high capillary repulsion, said washer encircling said shaft exteriorly of said housing between said housing and said tool attachment member, and having a small clearance relative to said housing and to said tool attachment member.

3. A portable device comprising a housing, motor means in said housing, means for selectively operating said motor means, an output shaft driven by said motor means and extending from said housing in a given direction, said shaft having a longitudinal axis, tool attaching means on said shaft exteriorly of said housing, a working tool having a longitudinal axis and detachably secured to said tool attaching means, said tool being pivotable in its entirety from a position in which said tool axis and said shaft axis are coincident to a position in which said tool axis is at an angle to said shaft axis, such pivoting of said tool reducing the maximum dimension of said device in the direction of said output shaft axis for storage of said device in a limited space.

4. A portable device as set forth in claim 3 wherein said tool and said tool attaching means cooperatively interfit in either of two axially spaced positions, the tool being pivotable relative to said attachment member away from the axis of said shaft in one of said positions and locked along the axis of said shaft in the other of said positions.

5. A portable device comprising a housing having opposed end walls and a plurality of sidewalls, said sidewalls including a pair of substantially parallel opposite sides of relatively larger area than the other walls, motor means mounted within said housing, motor support means supporting said motor means from said housing within an end portion thereof adjacent one of said end walls, shaft means operatively connected to said motor means for driving thereby and extending from said housing through said one end wall, a working tool mounted on said shaft externally of said housing, a pair of motor control members carried by said support means adjacent said motor means and mounted within said housing respectively adjacent said two opposite sides of larger area, either of said motor control means being effective to control starting and stopping of said motor, said opposite sides of larger area each including a flexible portion adjacent the respective motor control member for manual operation of either of said motor control members by pressing on and inwardly flexing the respective flexible portion.

6. A portable device as set forth in claim 5 wherein the motor means comprises an electric motor, wherein the two motor control members comprise electric switches, and further comprising means for holding batteries within said housing and disposed opposite said motor means relative to said shaft means and including battery contact means, and electric contact means connecting said switches in parallel between said battery contact means and said motor.

7. An electric toothbrush comprising a housing, an electric motor mounted within said housing, means for supporting a battery within said housing and including battery contact members, circuit means connecting said battery contact members to said motor for selectively operating said motor, a shaft disposed partly within said housing and extending therefrom, means operatively connecting said shaft and said motor for arcuately oscillating said shaft, a toothbrush secured to said shaft exteriorly of said housing and comprising a shank and bristles extending from said shank substantially normal thereto, said bristles having a predetermined length transverse of said shank and having a predetermined dimension longitudinally of said shank, said shank being disposed substantially axially of said shaft and being laterally flexible in the direction of said bristles, the tips of said bristles having a predetermined maximum linear speed and a predetermined linear extent of oscillation with said shank undeflected, deflection of said shank in the direction of said bristles attendant upon pressing of said bristles against a tooth or the like reducing both the linear speed of the bristle tips and the linear extent of oscillation of said bristle tips, said shank upon pressing of said bristles against the teeth deflecting substantially at the longitudinal midpoint of said predetermined dimension at least substantially one-half of said bristle length transversely of said shank.

8. An electric toothbrush comprising a two-part resilient housing; means in one part of said housing for supporting battery means; a motor drive sub-assembly comprising a frame, an electric motor, and electric connections to said motor and adapted for coaction with said battery support means and batteries carried thereby, said motor drive sub-assembly having an output shaft operatively connected to and driven by said motor; means in the other part of the housing for supporting said sub-assembly therein with said output shaft projecting through an opening in said housing, said sub-assembly supporting means comprising internal integral protuberances seated behind said motor drive sub-assembly; and means for detachably retaining the two housing parts in assembled relation.

9. An electric toothbrush as set forth in claim 8 wherein the motor drive sub-assembly comprises a pair of parallel spaced-apart plates having aligned apertures therein, wherein the electric motor has end bell hubs received in said apertures for mounting said motor between said plates, and wherein the electric connections to said motor are held against movement relative to said plates and restrain said motor against rotation about said hubs.

10. A motor driven device comprising a housing of resilient material, a motor drive sub-assembly comprising frame means, a motor, an output shaft, and means interconnecting said motor and said output shaft for driving said output shaft, said motor sub-assembly being supported in said housing with said shaft extending from said housing, said housing having an elliptical cross section and being openable, said ellipitical cross section having a predetermined major axis, and means for retaining said motor drive sub-assembly in said housing comprising protuberances on the inside of said housing lying on opposite sides of said major axis, said motor drive sub-assembly comprising means seated on said protuberances, said motor drive sub-assembly having a dimension in the direction of said housing major axis which is less than said major axis, whereby pressure exerted externally on said housing flexes said housing to shorten said major axis and move said protuberances away from said motor drive sub-assembly snap-over means to permit withdrawal of said motor drive sub-assembly from said housing.

References Cited by the Examiner

UNITED STATES PATENTS

| | | | |
|---|---|---|---|
| 1,992,770 | 2/1935 | Rathbun | 128—62 |
| 2,008,920 | 7/1935 | Moir | 64—4 |
| 2,093,007 | 9/1937 | Chott | 15—28 X |
| 2,158,738 | 5/1939 | Baker et al. | 15—22 |
| 2,160,835 | 6/1939 | Davids | 15—26 |
| 2,237,999 | 4/1941 | Newman | 15—23 X |
| 2,290,454 | 7/1942 | Steinberg | 15—22.1 |
| 2,319,205 | 5/1943 | Buck | 15—22 |
| 2,639,928 | 5/1953 | Robbins | 277—99 |
| 2,752,463 | 6/1956 | Staak | 200—157 X |
| 2,788,000 | 4/1957 | Lather et al. | 128—62 |
| 2,917,758 | 12/1959 | Held et al. | 15—22 |
| 2,960,713 | 11/1960 | Wistrand | 15—344 |
| 2,993,220 | 7/1961 | Nix et al. | 15—22 |
| 3,033,197 | 5/1962 | Barckley. | |
| 3,035,191 | 5/1962 | Kent | 310—50 |
| 3,043,996 | 7/1962 | Hartwig et al. | 318—17 |
| 3,104,405 | 9/1963 | Perrinjaquet | 15—22 |
| 3,142,852 | 8/1964 | Phaneuf | 15—22 |

FOREIGN PATENTS

| | | |
|---|---|---|
| 1,211,102 | 5/1962 | France. |
| 577,198 | 5/1958 | Italy. |
| 601,705 | 2/1960 | Italy. |

CHARLES A. WILLMUTH, *Primary Examiner.*